(12) United States Patent
Safar

(10) Patent No.: US 11,879,625 B1
(45) Date of Patent: Jan. 23, 2024

(54) VERSATILE ARM-WEARABLE ILLUMINATION DEVICE WITH WIRELESS CONTROL AND GLITTERING EFFECT

(71) Applicant: Samir Hanna Safar, Solana Beach, CA (US)

(72) Inventor: Samir Hanna Safar, Solana Beach, CA (US)

(73) Assignee: Samir Hanna Safar, San Diego, CA (US)

( * ) Notice: Subject to any disclaimer, the term of this patent is extended or adjusted under 35 U.S.C. 154(b) by 0 days.

(21) Appl. No.: 18/203,002

(22) Filed: May 29, 2023

(51) Int. Cl.
| F21V 23/04 | (2006.01) |
| A41D 13/01 | (2006.01) |
| G06F 3/01 | (2006.01) |
| G06F 3/0346 | (2013.01) |
| G06F 3/0362 | (2013.01) |
| F21Y 115/10 | (2016.01) |

(52) U.S. Cl.
CPC .......... *F21V 23/0471* (2013.01); *A41D 13/01* (2013.01); *F21V 23/0435* (2013.01); *G06F 3/011* (2013.01); *G06F 3/017* (2013.01); *G06F 3/0346* (2013.01); *G06F 3/0362* (2013.01); *F21Y 2115/10* (2016.08)

(58) Field of Classification Search
CPC ..... A41D 13/01; F21V 23/0471; G06F 3/011; G06F 3/017; G06F 3/0346; G06F 3/0362
See application file for complete search history.

(56) References Cited

U.S. PATENT DOCUMENTS

| 10,767,851 B1* | 9/2020 | Rapisarda | F21V 23/0471 |
| 11,089,825 B1* | 8/2021 | Ell | F21V 21/0816 |
| 2019/0059461 A1* | 2/2019 | Walker | A61B 5/6805 |
| 2019/0166933 A1* | 6/2019 | Tiffin | A41D 19/0013 |
| 2021/0315289 A1* | 10/2021 | Watson | F21V 33/0008 |
| 2021/0388979 A1* | 12/2021 | Maderic | F21V 33/0008 |
| 2022/0034490 A1* | 2/2022 | Kearns | F21V 21/0816 |
| 2022/0117335 A1* | 4/2022 | Glaiel | A41D 13/1161 |
| 2022/0256982 A1* | 8/2022 | Saluccio | F21V 21/0816 |
| 2023/0177939 A1* | 6/2023 | Burgess | G08B 5/38 |
| | | | 340/532 |

* cited by examiner

*Primary Examiner* — Christopher E Dunay
(74) *Attorney, Agent, or Firm* — Samir Hanna Safar

(57) ABSTRACT

An arm-wearable illuminating device comprising an arm sleeve and a light source. The arm sleeve is formed of a flexible and durable material. The light source comprises an illumination module and a sparkling tape which together forms a glittering effect. The light source further comprises an integrated circuit through which multiple sensors are connected for hands free controlling of the device. The sensors can sense the movement of user arm, and device can illuminate in response to those movements. The integrated circuit includes a control module consisting of small circuits with wireless connectivity for connecting to a handheld device. The control module receives signals from a mobile application and can change the colors of the device according to the user's preferences. This wearable illuminating device offers a new and exciting way to enhance personal style and is also useful for outdoor activities and events.

22 Claims, 19 Drawing Sheets

VERSATILE ARM-WEARABLE ILLUMINATION DEVICE WITH WIRELESS CONTROL AND GLITTERING EFFECT

FIELD OF THE INVENTION

The present invention relates to an arm-wearable illuminating device. Specifically, the present invention further relates to optical, electronic, textile, and plastic components used to build illumination devices, particularly wearable illumination devices for the arm. The current invention presents an arm-wearable illuminating device, which is operatively bendable for mounting on the arm, and is operatively stretchable for dismounting off the arm. The arm-wearable illuminating device comprise an array of light sources which are activated by movement of arm of the user.

BACKGROUND OF THE INVENTION

According to the prior arts, the light-reflective belts are widely adopted in the daily life for reflecting the incident light and raise the visual attention, and subsequently warn others to the appearance of the persons who wearing the light-reflective belts. However, the light-reflective belts may not produce the expected effects in the absence of the illumination, therefore are considered as passive alarming devices. Another scenario is that if the incident illumination is dim, the corresponding reflective light is relatively faint, and therefore the warning efficiency is rather low, namely, the light-reflective belts of the prior arts are lacking of self-illuminating function, which limit the capability of providing safety for those wearing the said belts in the dark locations.

Moreover, some recent arts demonstrate active light-reflective devices, which use light emitting diode (LED) installed on the products with alerting functions for use in the dark environment, and provide the safety of the user carrying them. The aforementioned products with alerting functions normally embed the LED's in a fixed structure, therefore are neither ready for hand-free carrying and nor for wearable on the arms, thereby limit the flexibility of usage and do not meet the user's requirement.

In order to solve the limitations of the prior arts, the objective of the invention is to provide a structural improvement in form of arm-wearable light-emitting device for overcoming the limitations.

Several patents have issued for devices directed to wrist illumination devices, each having a significant drawback. Barbour U.S. Pat. No. 4,521,832 refers to an illumination tool intended to provide light where it is needed without forcing the user to utilise a torch. The main component of the Barbour invention is a foam plastic wrist strap with a removable, self-contained battery that is attached using hook and loop fasteners. It also has a number of evenly placed lamps that offer light so the user can operate without holding anything in their hands.

Additionally, Barbour U.S. Design Pat. No. D596,325 is directed to an ornamental design for a wrist light. The Barbour inventions define a wrist light with only a limited number of lights; specifically, only four lights are claimed. In many situations, such limited illumination not be sufficient or may be blocked by the wrist of the user. The present invention addresses this need by providing lighting around the entire circumference of the wrist, in addition to offering an improved and less cumbersome design.

Other inventions are directed to remedying issues only tangentially related to those addressed by the present invention. Ask U.S. Pat. No. 4,812,953 is directed to a safety light band that maximizes the visibility of a pedestrian wearing the band in poorly lit or unlighted conditions. The band is formed as a flexible strap having fastening means for wearing the band on the person, and luminous means comprising an interactive combination of electric lamps and reflective surfaces. The Ask invention is designed to address the issue of personal visibility at night. While the present invention may be used in a manner that provides additional visibility, the primary issue addressed is providing illumination for work being performed.

Similarly, Rhine U.S. Pat. No. 4,910,652 is directed to an analog watch for training children to read the current time having a flashlight installed in the watchcase. The flashlight power supply is connected to the light emitting flashlight bulb through an electrical circuit that automatically turns the flashlight off after a time delay to preserve battery power. The watch time indicating face has numbers and dots to represent hours, and numbers and dots that represent minutes. The Rhine invention is directed away from the issues of the present invention, and specifically addresses the issue of teaching children to read a wristwatch.

Finally, other publications are directed to illumination only in a decorative sense. Lynch U.S. Pat. No. 6,578,982 is directed to a strap-like item of wearing apparel having studs capable of illumination. A light-emitting diode (LED) is disposed within each stud. The LED's are activated by means of a circuit. The Lynch invention, while serving as a trendy accessory, does not address the issue of providing illumination sufficient to allow the user to perform manual tasks with their hands. The present invention is designed to address this need.

While some patents have issued regarding wrist lighting devices, there is no device in the prior art that suitably addresses the need for a lightweight, directed, and arm-worn lighting device. The prior art inventions offer single or limited lighting and do not provide methods of controlling the light wirelessly or hands-free. The present invention addresses a need in the art, and subsequently it is clear that it provides a new structure that fulfils these needs.

SUMMARY OF THE INVENTION

The prime objective of this invention is to provide an arm-wearable illuminating device for improving the limitations of the prior arts, and to provide the users an alternative solution for product selection and replacement; more precisely, this invention hereby provides an arm-wearable illuminating device, which is furnished with specific structure thus enables the whole assembly more simple and convenient to use, this invention hereby provides an arm wearable illuminating device comprising a light source and a sparkling tape. The light source is powered by a rechargeable battery. The light source is further connected to an integrated circuit comprising a plurality of motion sensors. The motion sensors sense the patterns of movement of arm of user and based on the pattern the device is illuminated.

The present invention relates to a light apparatus designed for removably mounting onto the aim of a person. The arm-wearable illuminating device consists of a light source and sparkling tape. When these components are combined, they create a captivating and mesmerizing glittering effect.

It is accordingly an object of the invention that the arm-wearable illuminating device comprises a mobile connectivity application such that it can be controlled wirelessly.

It is accordingly an object of the invention that the arm wearable illuminating device comprises a matrix of illuminating modules that can be used to customised a specific pattern on the arm wearable illuminating device, wirelessly through the handheld device.

In another embodiment, the arm-wearable illuminating device comprises a integrated circuit with the light source. The integrated circuit comprises multiple sensors such as motion sensor and touch sensor through which the airs-wearable illuminating device can be controlled with motion of hands.

BRIEF DESCRIPTION OF THE ACCOMPANYING DRAWINGS

To understand the present invention, it will now be described by way of example, with reference to the accompanying drawings in which.

Figure 1:
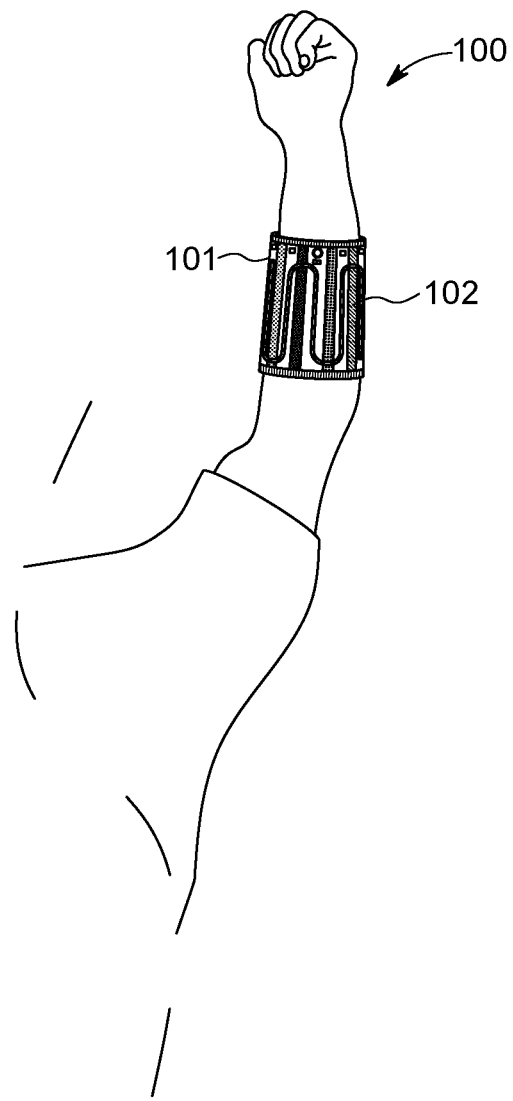
FIG. 1 is a plan view of arm-wearable illuminating device.

It should be appreciated by those skilled in the art that any block diagrams herein represent conceptual views of the illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION OF THE INVENTION

The following detailed description set forth below in connection with the appended drawings is intended as a description of exemplary embodiments in which the presently disclosed subject matter may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed arm-wearable illuminating device. However, it will be apparent to those skilled in the art that the presently disclosed subject matter may be practiced without these specific details. In some instances, well-known structures and devices are shown in functional or conceptual diagram form to avoid obscuring the concepts of the presently disclosed arm-wearable illuminating device.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present subject matter encompasses present and future known equivalents to the known components referred to herein by way of illustration.

Although the present subject matter describes arm-wearable illuminating device, it is to be further understood that numerous changes may arise in the details of the embodiments of the arable illuminating device. It is contemplated that all such changes and additional embodiments are within the spirit and true scope of this disclosure.

Unless explicitly stated otherwise, throughout the description and the claims, the words "comprise(s)," "comprising," "include(s)," "including," and the like, are to be construed in an inclusive sense as opposed to an exclusive or exhaustive sense; that is to say, in the sense of "including, but not limited to."

In the following detailed description of the embodiments of the disclosure, reference is made to the accompanying drawings that form a part hereof, and in which are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

As shown in FIGS. 1 to 5, a preferred embodiment of an arm-wearable illuminating device 100 that is worn around the arm by user comprises an arm sleeve 101 and a lighting device 102.

The alar sleeve 101 is made of flexible and translucent material. The arm sleeve 101 is made of durable and weather-resistant material, making it suitable for a variety of sporting events, whether indoor or outdoor. The arm sleeve 101 is designed to be lightweight and breathable, ensuring maximum comfort during prolonged use. The arm sleeve 101 can be used for various activities such as cycling, hiking, or working outdoors, the plastic-based min sleeve will protect the user's arms from the elements, including wind, rain, and UV rays. The arm sleeve 101 can be worn on the arm of user or it can be a bendable sheet that can be made of bendable plastic plate or bendable metallic plate, which is operatively bendable and stretchable.

The bendable sheet, provides good flexibly bendable characteristics, thereby enables the said arm-wearable illuminating device 100 easily and conveniently mounted on user's arm. Further on the operations of mounting and dismounting the said bendable sheet, the user can swing the said bendable sheet toward the arm when mounting the said bendable carrier, which will be wrapping around the arm via mechanic motion, and the user can stretch and pull the said bendable sheet for easy dismounting; moreover, the good flexibly bendable characteristics makes the wearing tight without uncomfortable feeling. At each end of the arm sleeve can comprise one or more fastening devices, such as a clasp, hook and loop fastening or other clasping or attaching means that allows the arm sleeve to attach around a user's wrist.

In another embodiment, the bendable arm sleeve can be worn around the all in a spiral configuration given the arm-wearable illuminating a unique design.

Figure 2:
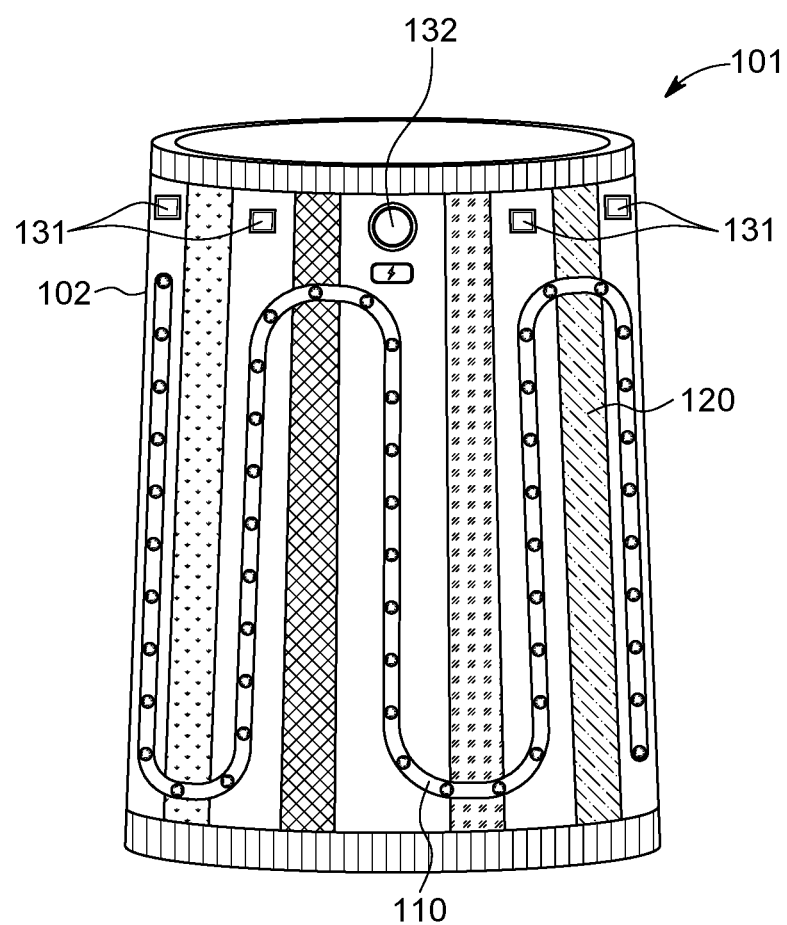
FIG. 2 is the perspective view of the light source of the arm-wearable illuminating device.

As shown in FIG. 2, the lighting device 102 is housed in the arm sleeve 101. The lighting device 102 comprises a lights source 110 and a plurality of sparkling tape 120. The light source 110 may comprise a decorative array of illumination module 111 connected to an integrated circuit 130 (shown in FIG. 3). The array of illumination module 111 runs vertically along the length of the arm sleeve 101. In another embodiment, the array of illumination modules 111 run in horizontally along the length of the arm sleeve 101 (not shown). The plurality of sparkling tape 120 comprises small reflective particles 121 on all the tapes, producing a glittering and reflecting effects. The reflective particles 121 can also comprise a series of small shiny and reflecting mirrors arranged together, such that when the lighting device is powered up the mirrors produce a shining effect when a user is wearing the al m-wearable illuminating device.

Figure 3:
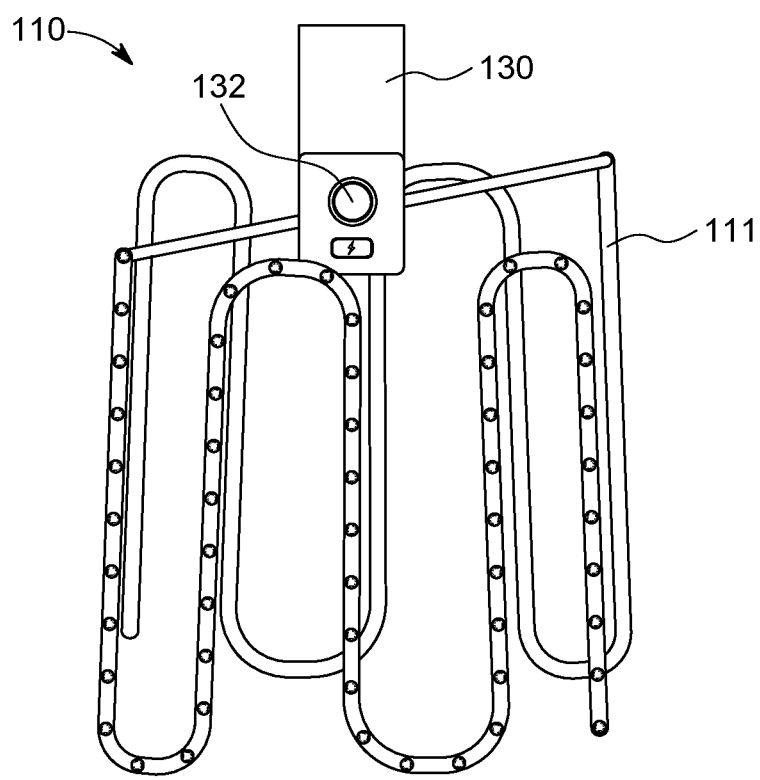
FIG. 3 illustrates detailed view of illuminating assembly of the light source.

Referring now to FIG. 2 and FIG. 3, the light source 110 will be described in greater details. The light source 110 comprises an illumination module 111 placed in a curved position along the area of arm sleeve 101. The illumination module 111 is connected to an integrated circuit 130. The integrated circuit 130 comprises a plurality of sensors 131 that are responsible for switching on/off the arm-wearable illuminating device 100. The light source 110 further comprises a power button for switching the device on/off. The integrated circuit 130 further includes a rechargeable battery. The rechargeable battery is responsible for powering the illumination module 111.

The illumination module 111 comprises a plurality of lights that may be LEDS or any other suitable type of illuminating device. The plurality of lights may be housed securely in arm sleeve 101 which confine the light source. The lights may be turned on and off by a switch provided on the arm sleeve 101. Additionally, the lights may be battery-powered, wherein the battery is housed in the arm sleeve 101 along with the integrated circuit 130. Electrical connections are provided beneath, through or above the arm sleeve 101, providing electrical power to all lightings simultaneously or in a pattern that would allow certain lights or intensities thereof to be utilized at a given time. The invention may be made available in a variety of colors to suit user preferences and may be waterproof for use while diving, running in the rain, or other various wet conditions.

The light source 110 comprises a plurality of sensors 131 essentials for the functionality of the arm-wearable illuminating device 100. These sensors 131 include the accelerometer sensor and gyroscope sensor that detect motion and send signals to the control module, which then activates the sparkling tape and LED lights on the sleeve. The sensors 131 are strategically placed on the sleeve to ensure accurate movement detection. They are designed to be highly sensitive, so even the slightest movement can trigger them. Furthermore, the sensors 131 are designed to conserve battery power by only activating the sparkling tape and LED lights when motion is detected or it is being tapped. This ensures that the sleeve can be used for an extended period without needing to be recharged frequently.

In one embodiment, the light source 110 comprises a motion sensor connected to the integrated circuit 110 for turning on/off the illumination module 111. Specific functions can be assigned to the motion sensor for controlling the activity of the light source 110. For example—rotating the arm once turns on the lights and rotating the arm twice turns off the lights, waving the arm from one direction to another direction can also results in change of colors of the lights.

In another embodiment, the light source 110 comprises touch sensors provided on the arm sleeve 101. The touch sensor is connected to the integrated circuit 130 and is responsible for turning on/off the lightings or controlling the illumination of the illumination sources. For example—tapping the arm sleeve 101 where the touch sensor is available turns on the illumination and double tapping the touch sensors turns off the illumination.

Figure 4:
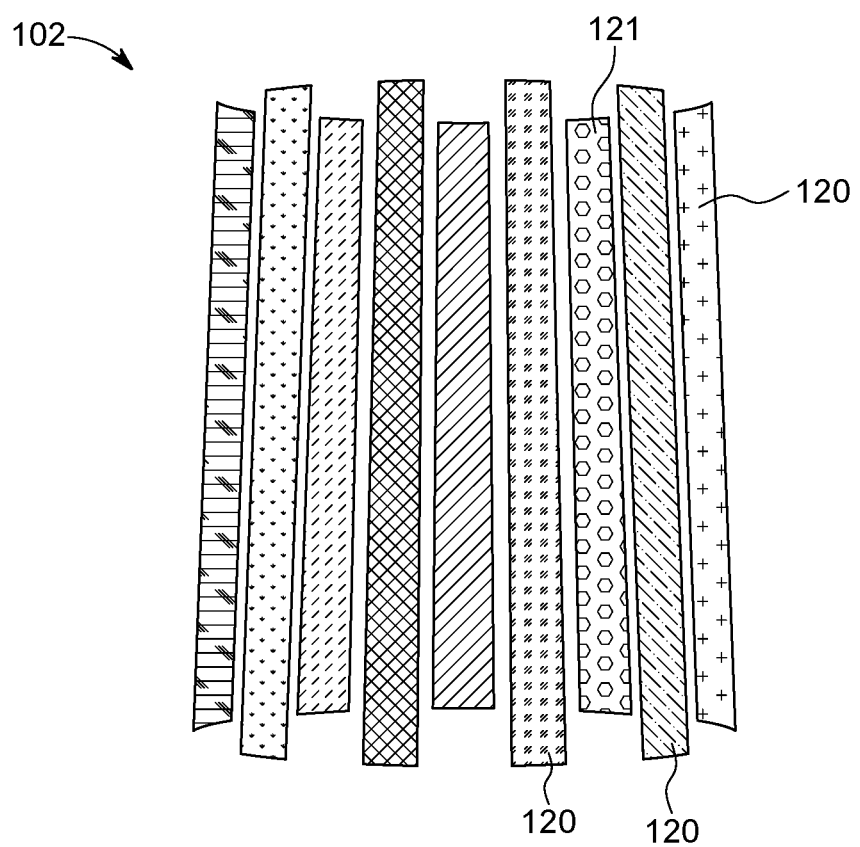
FIG. 4 illustrates detailed view of the sparkling tape installed in the light source.

Referring now to FIG. 2 and FIG. 4, the sparkling tape 102 will be described in greater details. As seen in FIG. 4, the sparkling tape 102 comprises a plurality of sparkling strips 120 that runs vertically along the length of the arm sleeve 101 and are arranged along the periphery of the arm sleeve 101. In one embodiment, the sparkling tape 102 comprises a plurality of small reflective particles 121, giving the strips a glittering and eye-catching appearance. In another embodiment, the sparkling tape 102 comprises small reflective mirror 121 type elements that are responsible for reflecting the light coming from the illuminating strip.

Figure 5:
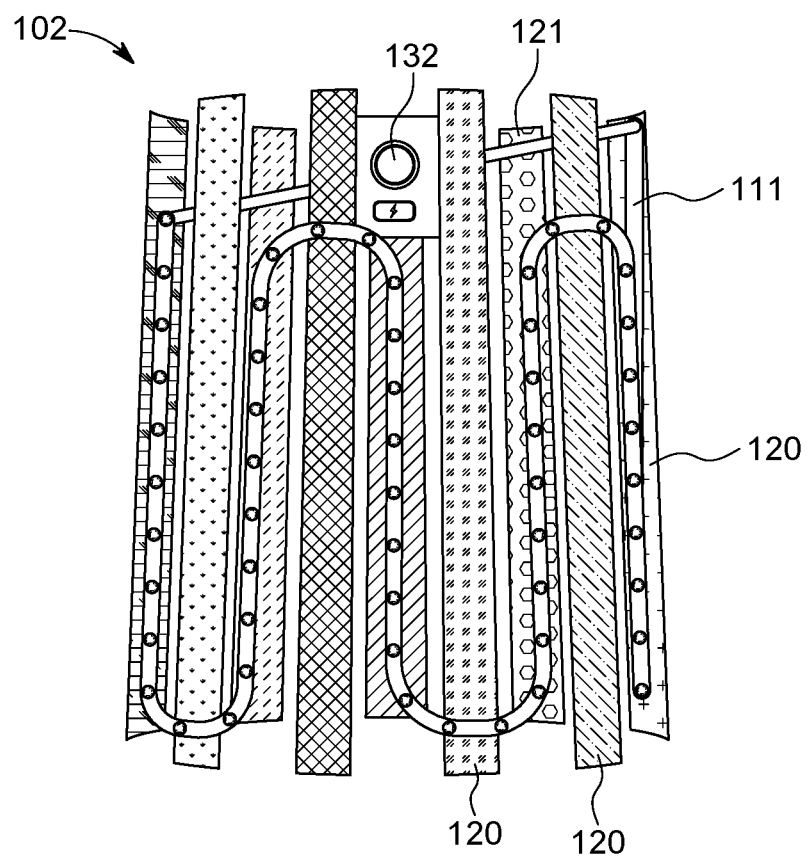
FIG. 5 illustrates the illuminating assembly and the sparkling tape arranged together.

FIG. 5 shows the light source 101 and sparkling tape 102 arranged together. Both, the light source 101 and the sparkling tape 102 forms an illuminating effect that is visible from a distant location. The arm-wearable illuminating device 100 can be turned on automatically by creating motion from hands such as waving. The motion sensors are recognise various function that various hand movements make and based on such movements the arm-wearable illuminating device can be turned on automatically. In another embodiment, the arm-wearable illuminating device can be turned on with the help of the switch provided on the arm sleeve 101.

Figure 6:
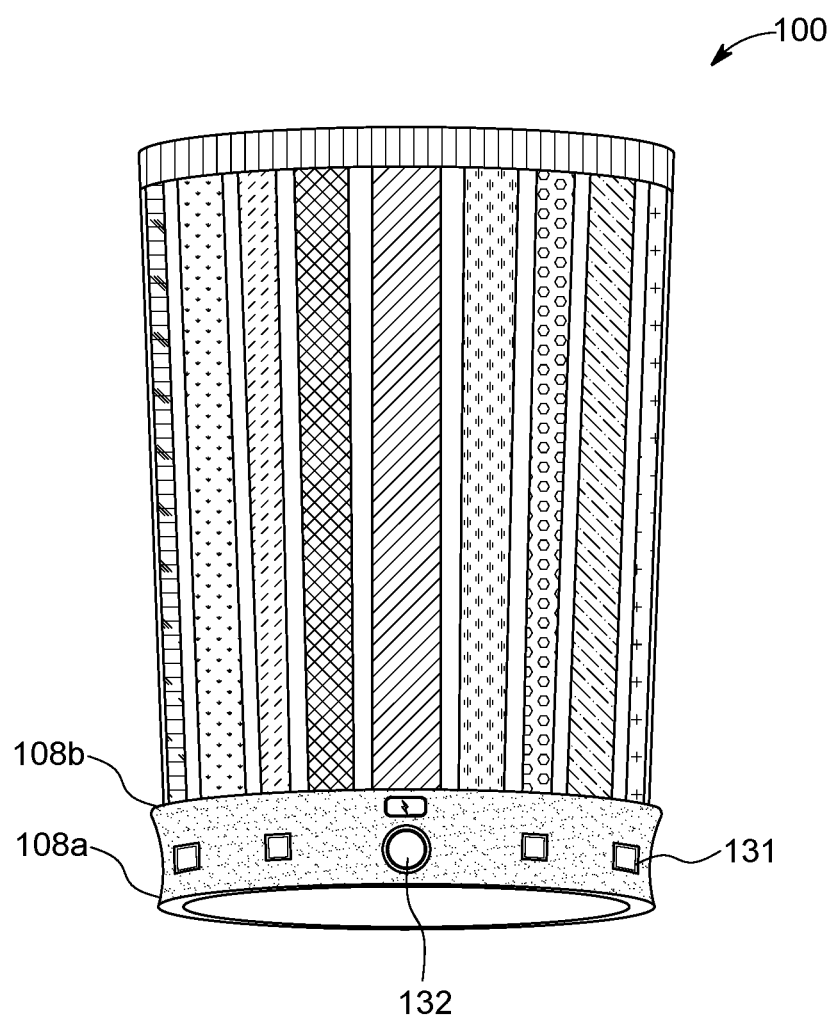
FIGS. 6 and 6a illustrates the arm-wearable illuminating device with an elastic loop on its proximal end and shows the top view of the arm wearable illumination device
Figure 6A:
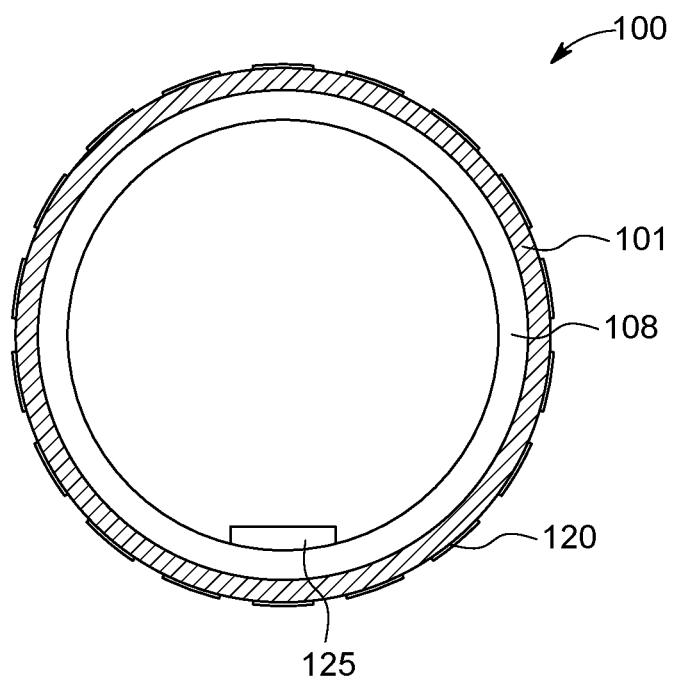
Figure 7:
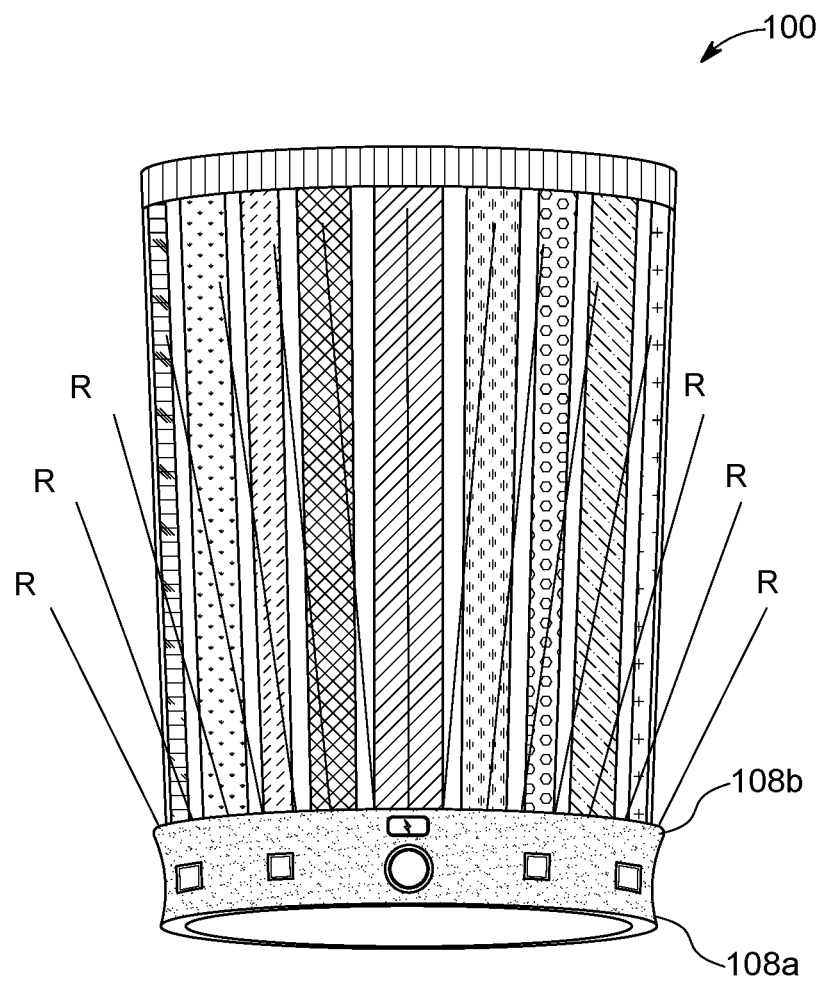
FIG. 7 illustrates the arm-wearable illuminating device with light rays R.

In another embodiment shown in FIG. 6-7, the all i-wearable illumination device 100 comprises an elastic loop 108 provided on the front end of the arm-wearable illumination device 100. The front end of the arm-wearable illumination device 100 refers to side of which is proximal to the fingers of the user. Control knob 132, forward button 104, reverse button 105 and the sensors 131 can be accommodated in the elastic loop 108. FIG. 6a shows the top view of the arm-wearable illumination device 100 with the elastic loop 108. The diameter of the elastic loop is less that the diameter of the arm sleeve 101. A battery 125 is housed in the elastic band 108. The elastic loop 108 comprises two ends 108a and 108b. End 108a is closed such that no circuit is visible from this end. End 108b is open such that the arm sleeve 101 is accommodated therein. Sparkling tape 102 passes from arm sleeve 101 and ends at the end 108a. A void space is created in that region such that light rays R from the light source 110 also passes from the open end 108b as shown in FIG. 7, and is reflected by the sparkling tape 102 creating a luminance effect around the elastic band 108.

The elastic loop 108 is form of a flexible material and fix on the arms of the user tightly such that the arm-wearable illuminating device 100 doesn't loosen when worned by the user.

Figure 8:
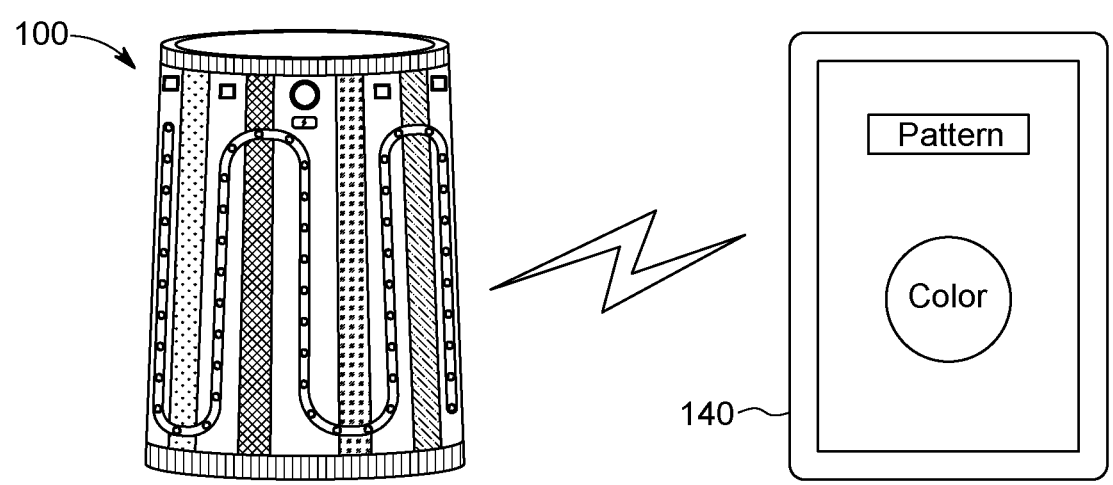
FIG. 8 illustrates arm-wearable illuminating device wirelessly connected to a handheld device.

As shown in FIG. 8, the arm sleeve 101 can be connected to a handheld device 140. The handheld 140 includes one or more processing devices for executing other applications and a user interface that includes, for example, buttons, a display screen such as a touch screen, a speaker, a microphone, and/or other user interface devices. The integrated circuit 130 comprises a control module composed of small circuits. The control module has a wireless connectivity for connecting to the handheld device 140. The wireless communication can be done through channels such as Bluetooth Wi-Fi, Global System for Mobile (GSM), ZigBee, and Radio Frequency Identification (RFID). The control module is responsible for receiving the signals from sensor and activating the light source. The handheld device 140 can comprise a specific application 141 responsible for controlling the arm-wearable illuminating device 100. Furthermore, the control module receives signals from a mobile application 141 and changes the colours as per the user will.

Figure 9:
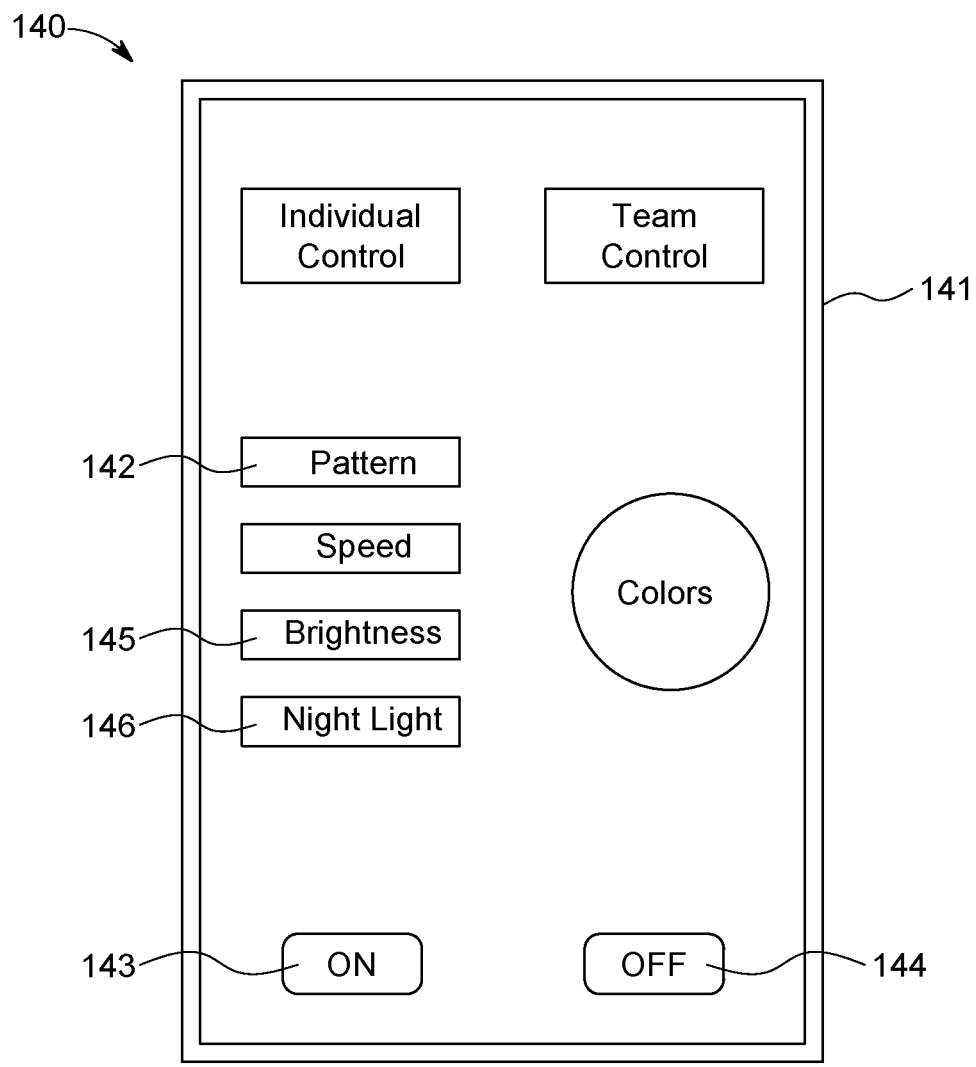
FIG. 9 illustrates the mobile application that is used for controlling the arm-wearable illuminating device wirelessly.

As shown in FIG. 9, the mobile application 141 comprises a panel 142 for controlling the pattern. The application is connected to a server online which acts as a storage for storing information required for functioning of the al 1i-wearable illuminating device 100. The panel 142 comprises a plurality of pattern options which can be selected for displaying on the arm-wearable illuminating device 100. Once the desired pattern is selected, the application 141 sends the instructions to the control module, which then displays the pattern using its LED lights and sparkling tape. The arm-wearable illuminating device 100 can be turned on and off using options 143 and 144, and the brightness can be adjusted using panel 145 the application 141. The application 141 further comprise an option of night light 146 which can function as a torch when the person in travelling/walking on a path with no or very less visibility.

In another embodiment, the integrated circuit 130 can also include a sound system that can be operated from the mobile phone which is at a distant position from the arm-wearable illumination device.

In another embodiment, the control module can be controlled with the help of various buttons that are present on the arm sleeve 101. The control module can comprise a control knob 132 for allowing the user to adjust the light setting. The control knob 132 comprises two functions, rotating function and a pressing function. Rotating the control knob 132 changes the pattern of light that can be displayed on the arm-wearable illumination device and pressing the control knob 132 as a button selects the specific pattern of the light associated with the turning of the control knob 132. The control module can further comprise another button for switching on/off the light source 110.

In another embodiment of the current invention the integrated circuit 130 comprises a USB port. The USB port can be used for charging the battery connecting the integrated circuit 130, or can be used as a connection between the handheld device 140 and the control module.

Figure 10:
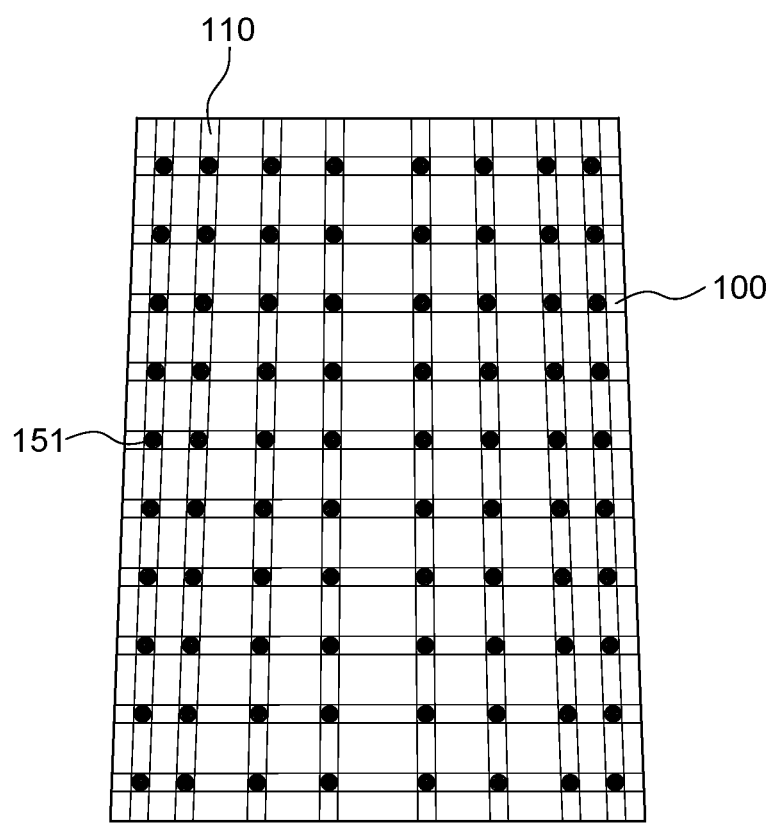
FIG. 10 illustrates an embodiment of the arm-wearable illuminating device.

In another embodiment as shown in FIG. 10, an arm illuminating device 100 comprises a light source 110 comprises a matrix 151 of LEDs arranged together. The matrix 151 is arranged together with the sparkling tape 120. The arm illuminating device 100 further comprises an integrated circuit 130 comprising a controller 131. The arm illuminating device 100 can be connected to handheld device 140 wirelessly as explained in the previous embodiments. The handheld device 140 can be used to control the illumination of the arm-wearable illuminating device 100.

Figure 11:
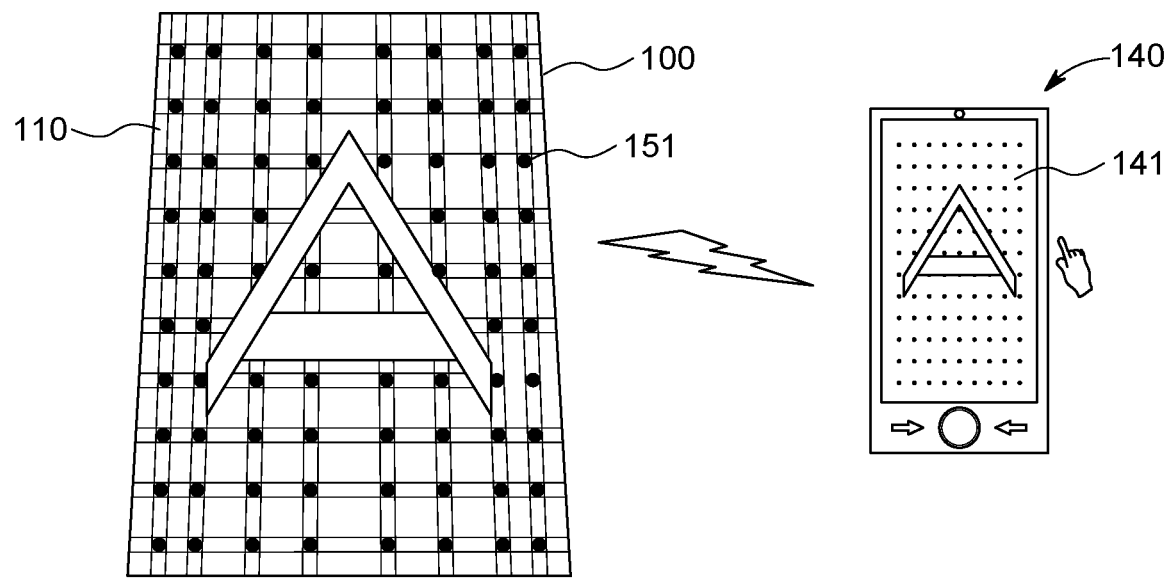
FIG. 11 illustrates a user inputting the command on the handheld device.

As seen in FIG. 11, the handheld device 140 comprises a display screen 141. The display screen 141 can be used to define specific characters and logos on the arm-wearable illuminating device 100. The display screen 141 displays the matrix of the LEDs on the screen that can be illuminated. The user with the help of his finger can draw specific shapes or logos on the matrix by connecting the dots and the corresponding LEDs will be illuminated on the arm-wearable illuminating device 100.

Figure 12:
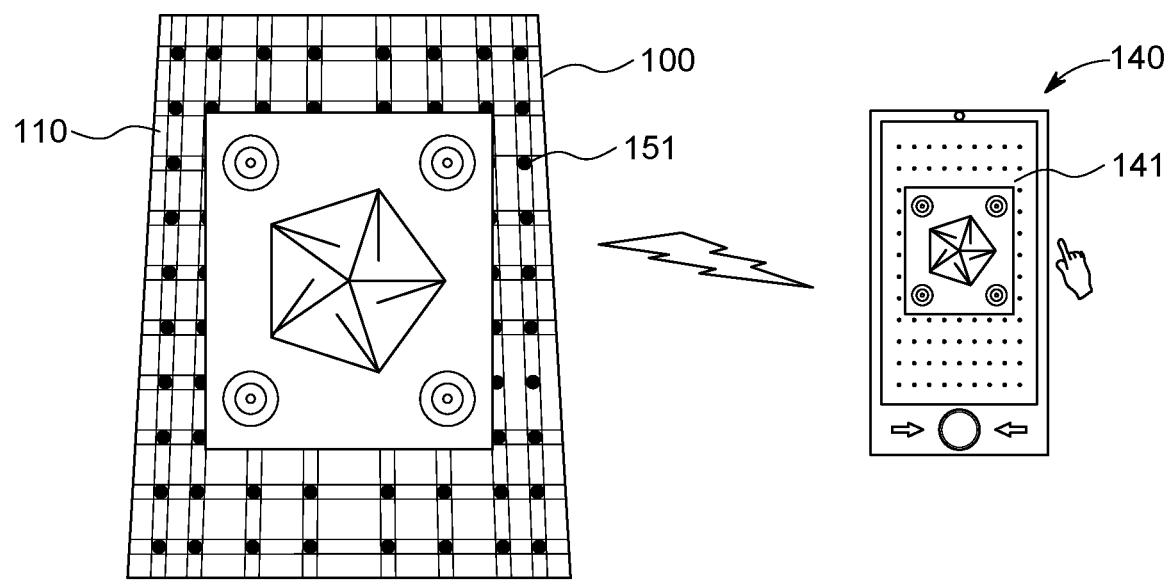
FIG. 12 illustrates a user inputting an image on the handheld device.

In another embodiment, as seen in FIG. 12 specific images can be inserted into from the handheld device 140 memory or through internet and the same can be converted into pixelated image and same can be displayed on the display screen 141 and on the arm-wearable illuminating device 100.

The handheld device 140 comprises a memory that can be used to store the previous commands that were given and can be repeated when the user is scrolling through the options of illuminating the device 100.

Figure 13:
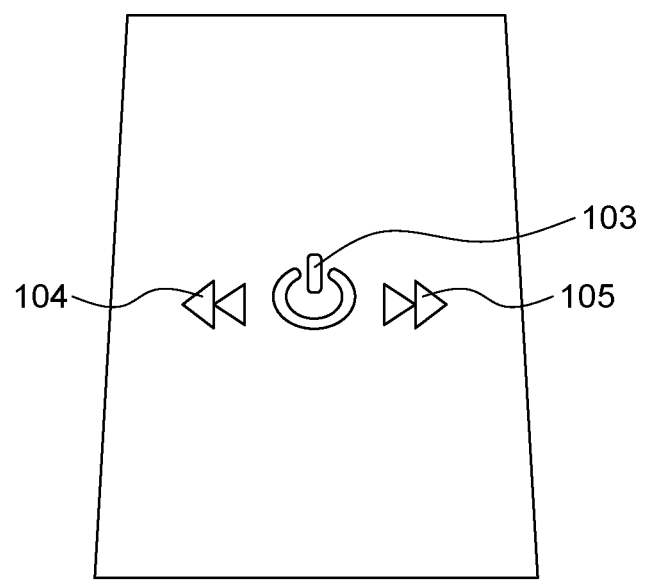
FIG. 13 illustrates input controls on the arm-wearable illumination device.

The integrated circuit 130 further comprises a local memory for storing the instructions received from the handheld device 140. Further, the local memory also stores some predefined patterns that can be illuminated on the device 100. As displayed in the FIG. 13, the arm-wearable illuminating device 100 comprises a power button 103 for turning on/off the device. Adjacent to the power button 103, there is a forward button 104 and a reverse button 105. Pressing the forward button 104 switches the lighting pattern on to the next one and pressing the reverse' button 105 switches the lighting pattern to a reverse one.

Now, the various applications of the arm-wearable illumination device will be discussed in greater details.

Figure 14:
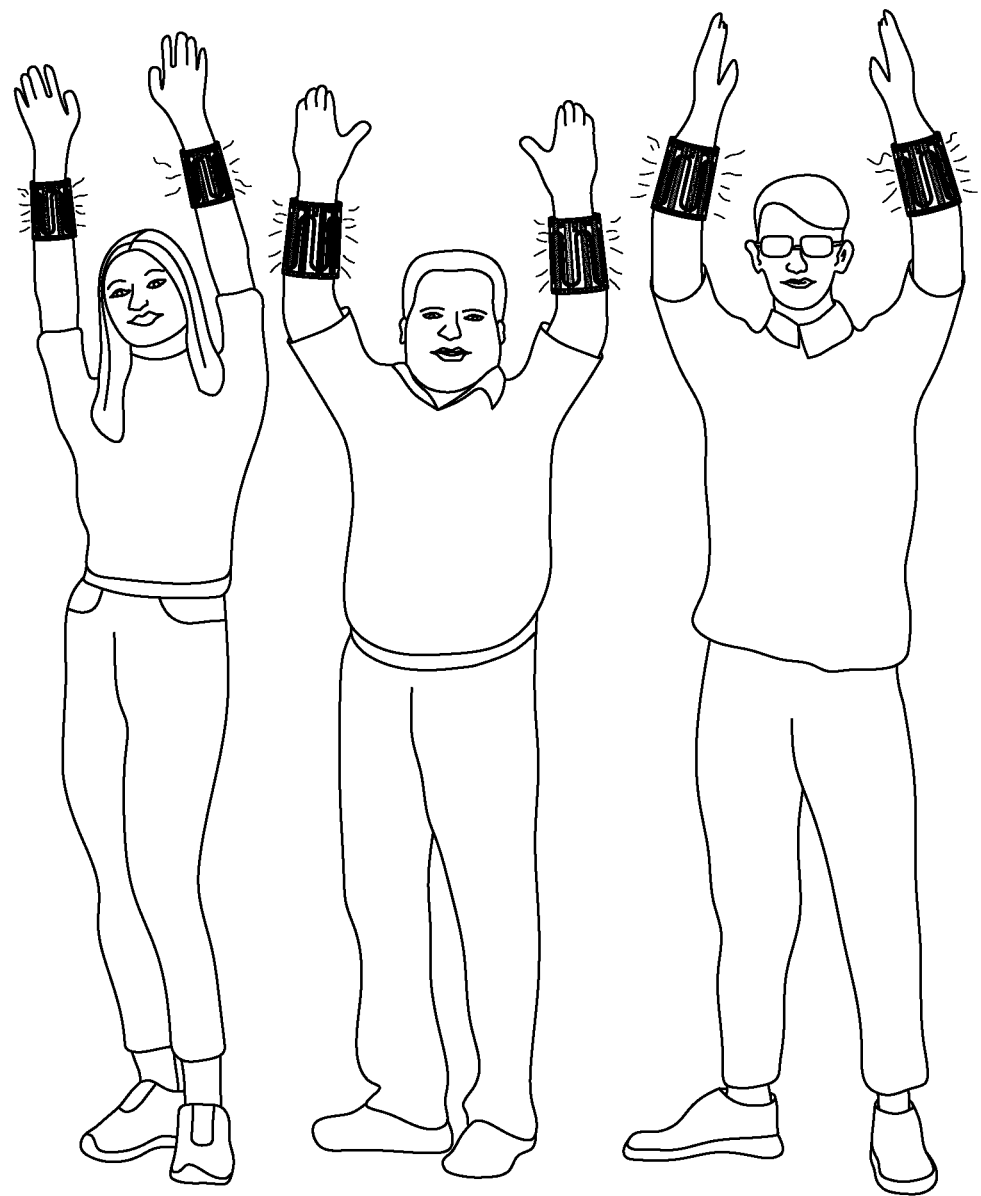
FIG. 14 illustrates a group of people wearing the arm-wearable illuminating device.

As shown, in FIG. 14, the arm-wearable illuminating device 100 can be wearied by a user who is attending a sports match in a ground. The mobile application of the device can be connected to multiple device comprising the same application, and one master controller (shown in FIG. 9) can be selected from the connected devices. The controller will be responsible for selecting a colour that matches with a particular team. The fans can show their support to their team in an effective and exciting way. The users/fans that now become active participants supporting their teams rather than passive observers. The users/fans can input the specific logo of their team to be displayed on the arm-wearable illuminating device.

Figure 15:
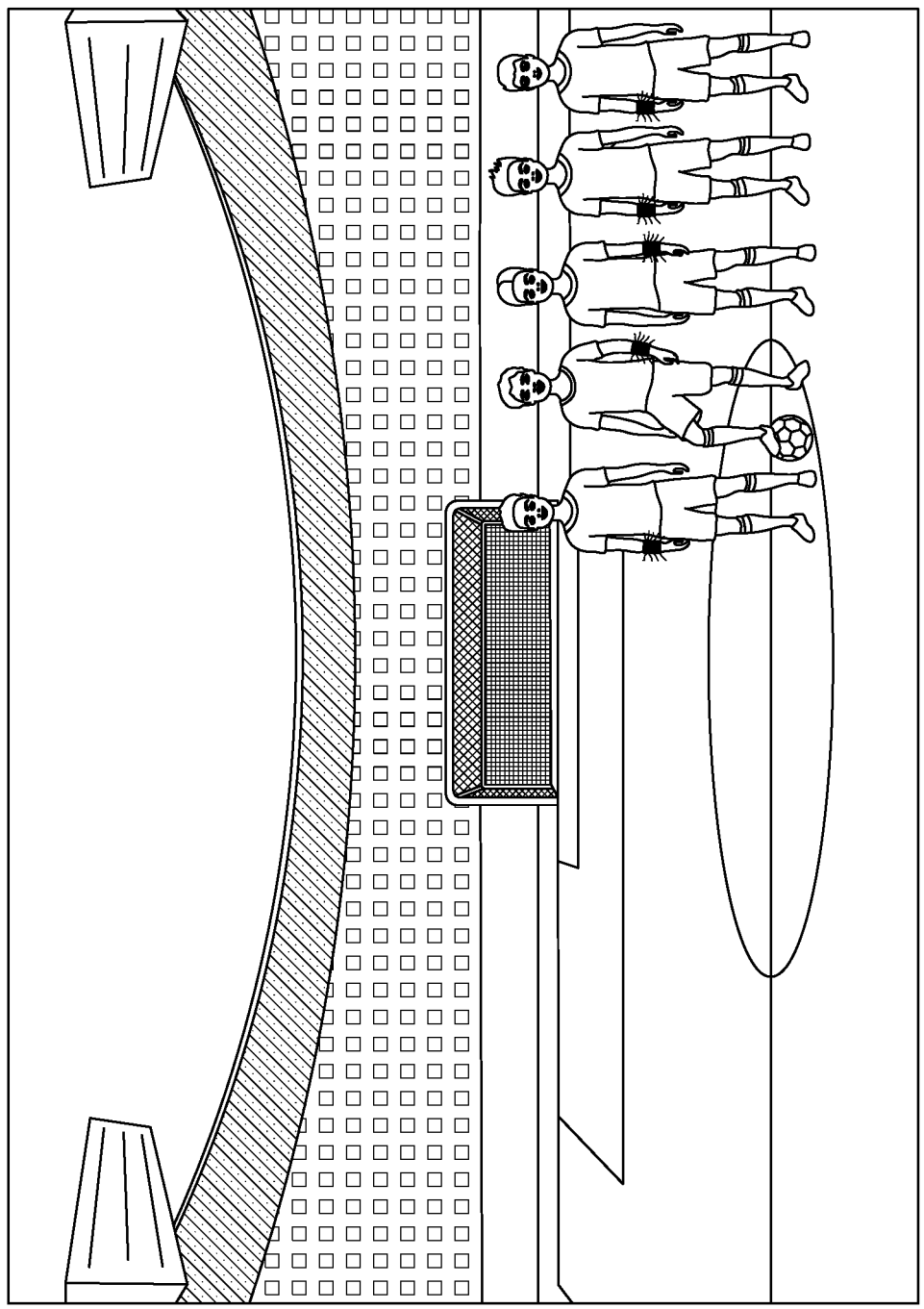
FIG. 15 illustrates the arm-wearable illuminating device worn by the players of a team.

In another embodiment, as shown in FIG. 15, the arm-wearable illuminating device can be wearer by the players of a team, and all the sleeve can be given a specific color corresponding to the team, such that in a large playground area, fans can actively see their team in action. Wearing the sleeve can help to cultivate a sense of camaraderie and pride among team members, encouraging them to work together towards a common goal. Furthermore, the sleeve can also be worn outside of games or events, allowing team members to show their support for their team wherever they go.

Figure 16:
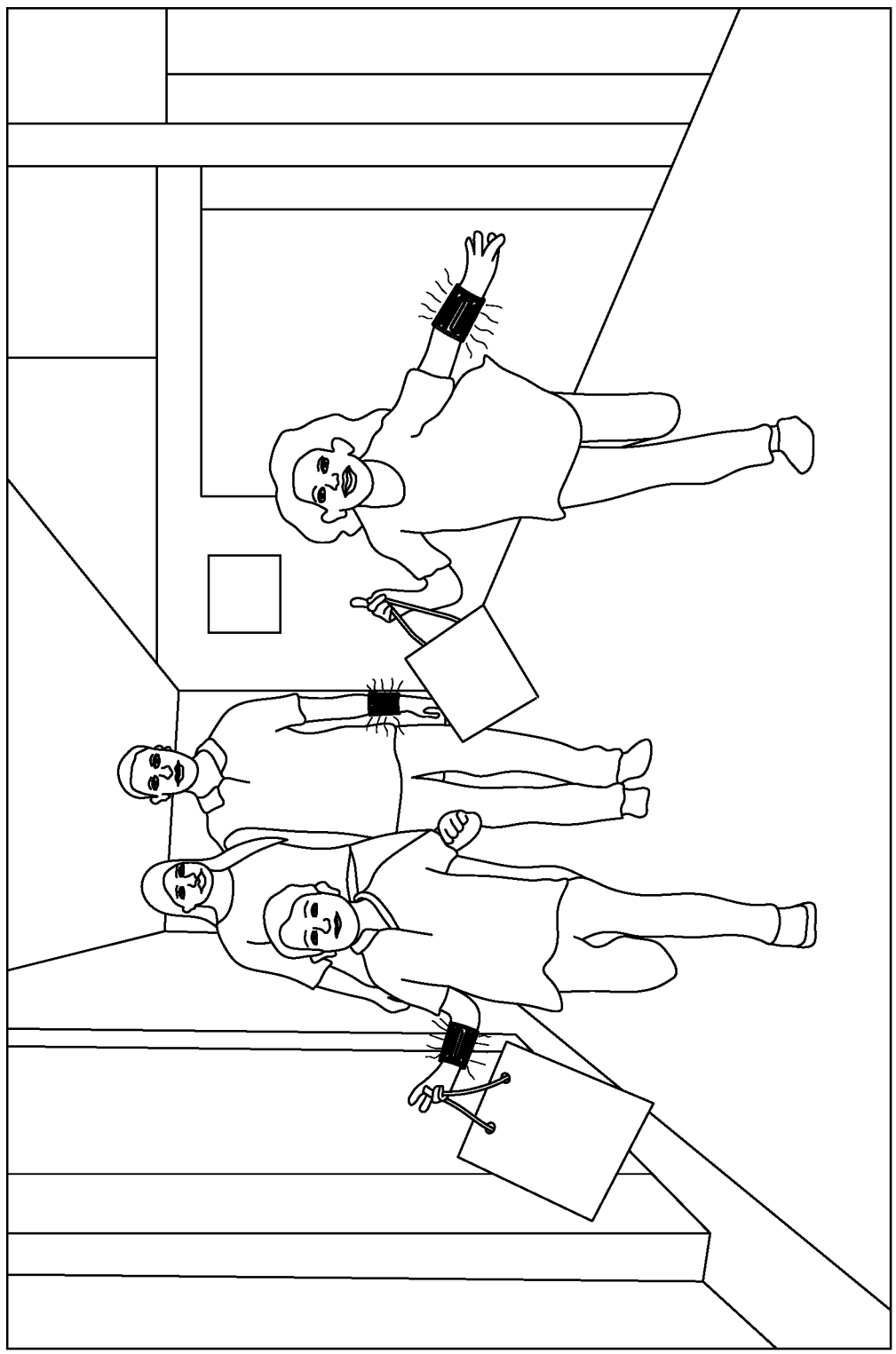
FIG. 16 illustrates the arm-wearable illuminating device worn by a family in a crowded place.

In another embodiment, as shown in FIG. 16, if the users is travelling in a crowded place, such as a busy shopping mall, amusement park or festival. In such situations, it's easy to get separated from your loved ones, especially if you're travelling with kids who may wander off or get distracted by the many sights and sounds around them. The arm-wearable illuminating device can be worn by a family, who is present in a crowded place. It will be easier for the parents to locate the kid. The parents can also turn on the sound system in case the child is not near and can be located easily with the help of specific light pattern and sound. The arm-wearable illuminating device mounted on the arm of the user can provide the user an alerting signal to the others when the user is in the darkness or low-visibility environments for the safety purpose. The old people, women, and children are also among the users of this sleeve for self-protection in the darkness or low-visibility environments.

Figure 17:
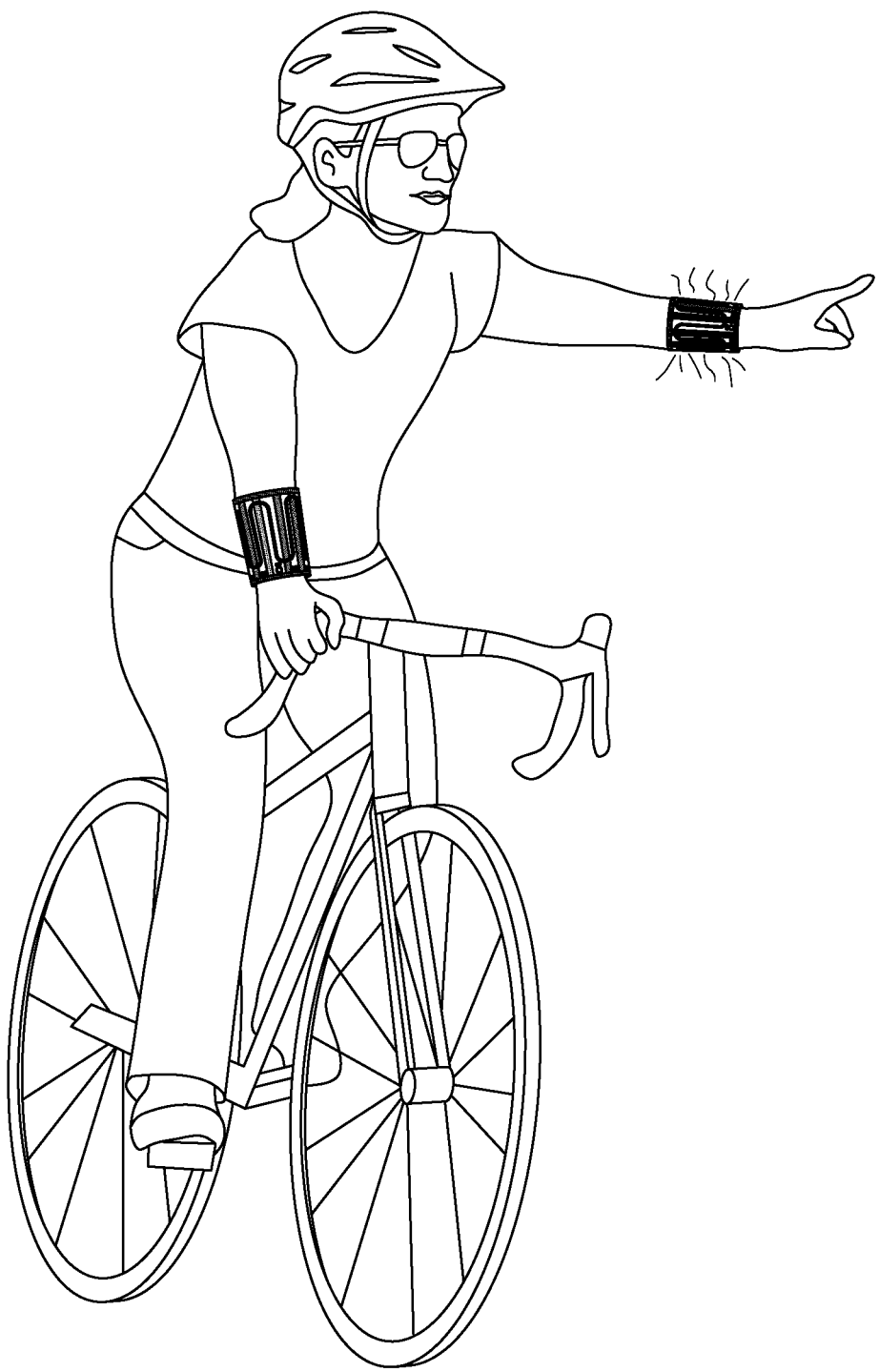
FIG. 17 illustrates the arm-wearable illuminating device worn by a cyclist.

In another embodiment, as shown in FIG. 17, the arm-wearable illuminating device can be worn by a cyclist. While taking turns or moving on a curve that cyclist can signal other vehicles coming from his/her behind.

Figure 18:
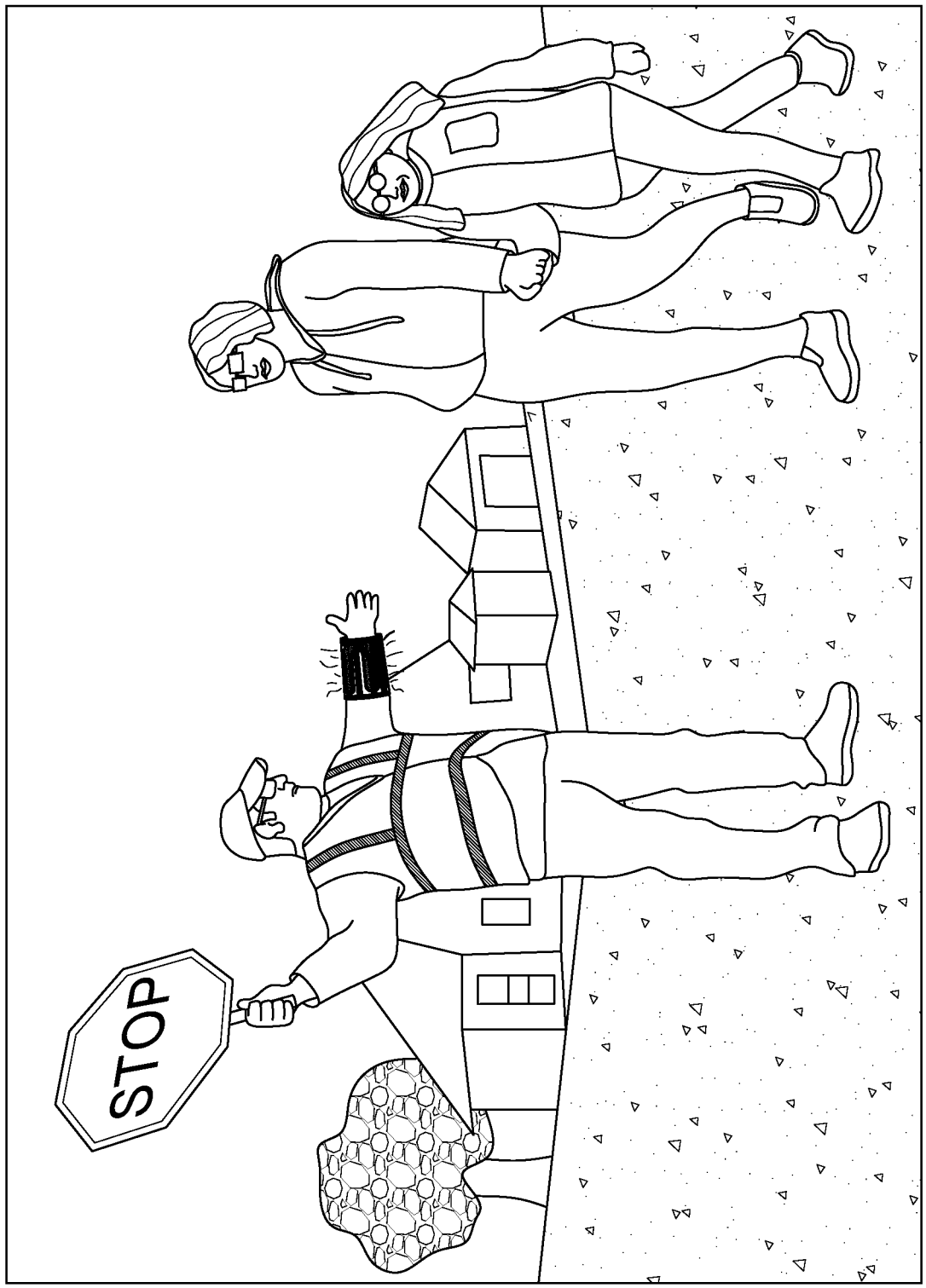
FIG. 18 illustrates the arm-wearable illuminating device worn by a traffic police personnel.

In another embodiment, as shown in FIG. 18, the arm-wearable illuminating device can be worn by a traffic police personnel to control the traffic in an area.

In embodiments of FIG. 17 and FIG. 18, the users can wear the arm-wearable illuminating device in both hands. The arm-wearable illuminating device can be program to illuminates specific colours when specific hand signs are made. Such as if the users raise the hand above straight, the arm-wearable illuminating device can display RED colour indicating the other passengers travelling on road to STOP. If the user raises his hands in a horizontal direction indicating a turn, then the arm-wearable illuminating device displays a GREEN or YELLOW colour indicating the turn in the direction in which the hand is raised horizontally. By providing clear and reliable turn indications, it helps to prevent accidents and ensure smooth traffic flow, keeping drivers and pedestrians safe on the road.

Thus, various modifications of these disclosed embodiments are apparent to those skilled in the art, from the description and the accompanying drawing. The principle associated with the various embodiments described herein may be applied to the other embodiments. Therefore, the description is not intended to be limited to the embodiments shown along with the accompanying drawings but is to be providing the broadest scope of consistency with the principles and the novel and inventive features disclosed or suggested herein. Accordingly, the invention is anticipated to hold on to other alternatives, modifications, and variations that fall within the scope of the present invention and appended claims.

The invention claimed is:

1. A wearable illuminating device for the arm, comprising:
 a flexible arm sleeve configured to be worn around the arm of a user;
 a light source disposed within the flexible arm sleeve, wherein the light source includes: an illuminating module, a battery coupled to said light source,
 a sparkling tape arranged to create a glittering effect,
 an integrated circuit coupled to said battery and to said light source,
 an integrated circuit that includes multiple sensors configured to enable the hands-free operation of the device; wherein
  the sensors are configured to sense the motion of the arm of the user, the motion of the arm of the user is fed as an input to integrated circuit, and based on a pattern of motion of the said arm of the user,
  said integrated circuit being operative to illuminate said light source in response to the said pattern.

2. The wearable illuminating device for the arm, as claimed in claim 1, wherein the integrated circuit can also comprise a control button present on the arm sleeve for controlling the functions of the arm wearable illumination device.

3. The wearable illuminating device for the arm, as claimed in claim 1, wherein the integrated circuit can be connected to a handheld device wirelessly.

4. The wearable illuminating device for the arm, as claimed in claim 3, wherein the handheld device comprises an application for controlling the functioning of the arm-wearable illuminating device.

5. The wearable illuminating device for the arm, as claimed in claim 4, wherein the application functions as an input device for receiving commands from the user to display various patterns on the arm-wearable illuminating device or inserts an image from the handheld device.

6. The wearable illuminating device for the arm, as claimed in claim 1, wherein the integrated circuit comprises multiple motion sensors comprising accelerometer sensor and gyroscope sensor that detect motion and send signals to the control module, which then activates the sparkling tape and LED lights on the sleeve.

7. The wearable illuminating device for the arm, as claimed in claim 1, wherein the integrated circuit comprises a touch sensor.

8. The wearable illuminating device for the arm, as claimed in claim 1, wherein the integrated circuit comprises a sound system.

9. The wearable illuminating device for the arm, as claimed in claim 1, wherein a plurality of arm-wearable illuminating devices can be connected to a single mobile application to control the plurality of arm-wearable illuminating devices together.

10. The wearable illuminating device for the arm, as claimed in claim 1, wherein the sparkling tape comprises small reflective particles, producing a glittering and reflecting effects.

11. The wearable illuminating device for the arm, as claimed in claim 10, wherein the small reflective particles comprise small mirrors.

12. The wearable illuminating device for the arm, as claimed in claim 11, wherein the elastic loop comprises an open end and a closed end, and wherein the arm sleeve is attached to the elastic loop via open end.

13. The wearable illuminating device for the arm, as claimed in claim 12, wherein when the arm-wearable illuminating device is illuminated, the open end of the elastic loop reflects lights through the sparkling tape and creates a luminance effect near the elastic loop.

14. The wearable illuminating device for the arm, as claimed in claim 1, further comprising an elastic loop on its proximal end.

15. The wearable illuminating device for the arm, as claimed in claim 1, wherein the LED lights can be arranged in various orientations, including but not limited to diagonal, vertical, or horizontal.

16. The wearable illuminating device for the arm, as claimed in claim 15, wherein the integrated circuit comprises a sound system which can be remotely controlled by the mobile application.

17. The wearable illuminating device for the arm, as claimed in claim 15, wherein a plurality arm-wearable illuminating devices can be connected to a single mobile application to control the plurality of arm-wearable illuminating devices together.

18. The wearable illuminating device for the arm, as claimed in claim 15, further comprising an elastic loop on its proximal end.

19. The wearable illuminating device for the arm, as claimed in claim 15, wherein the wearable illuminating device for the arm can be connected to a single mobile application, allowing control over multiple wearable illuminating devices simultaneously.

20. The wearable illuminating device for the arm, as claimed in claim 1, further comprising a control knob that allows users to adjust the light settings, including the desired light mode, color, and flashing pattern.

21. The wearable illuminating device for the arm, as claimed in claim 1, wherein the flexible arm sleeve is made of a flexible, translucent, breathable, light-weight, durable and weather-resistant material for outdoor and indoor applications.

22. The wearable illuminating device for the arm, as claimed in claim 1, wherein the wearable illuminating device for the arm is capable of providing an alerting signal to the others in darkness or low-visibility environment for safety or self-protection.

* * * * *